Dec. 16, 1941.  W. H. BASELT  2,266,701
CLASP BRAKE
Filed Sept. 11, 1940  4 Sheets-Sheet 2
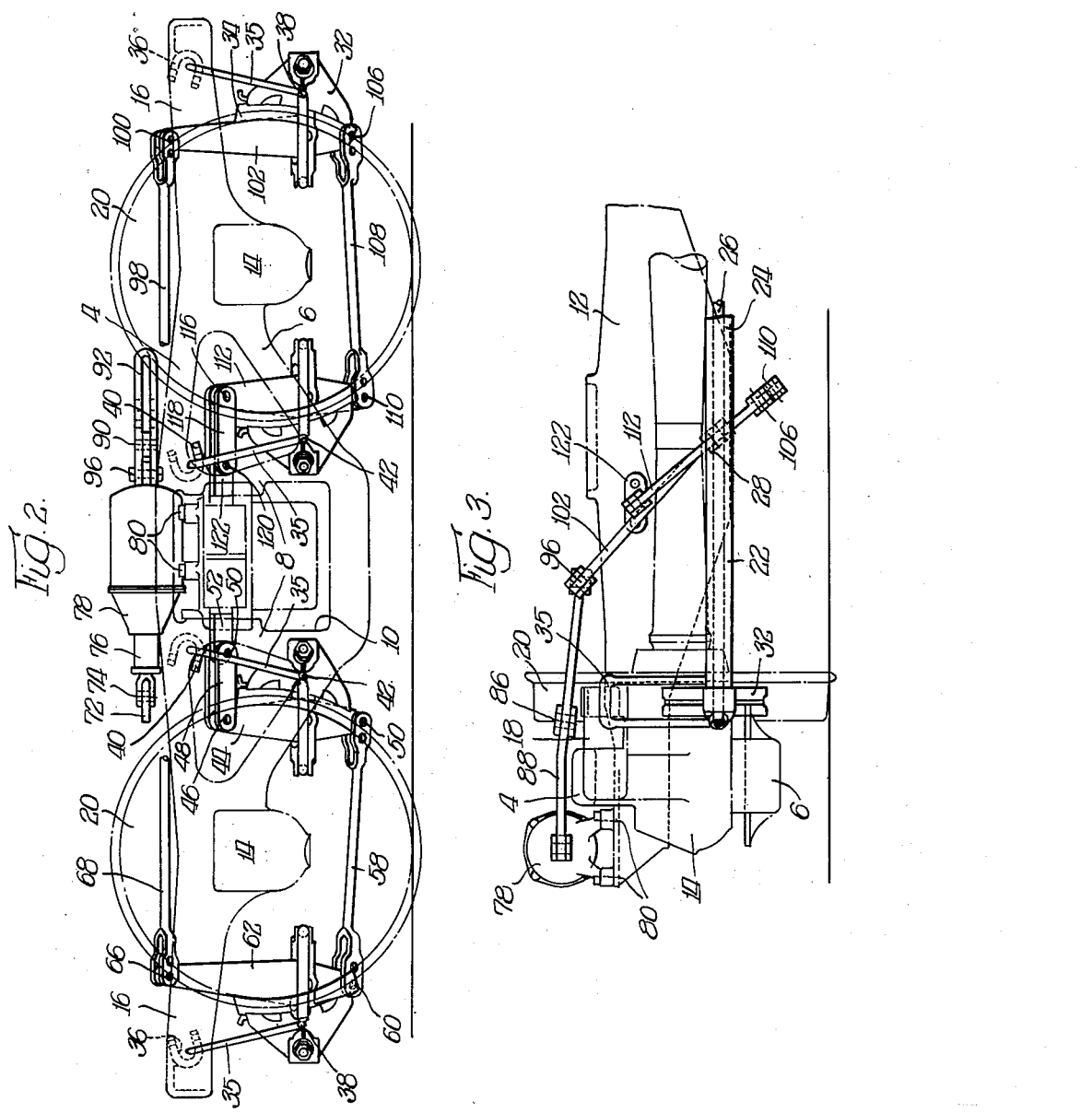
INVENTOR.
Walter H. Baselt,
BY
ATTY.

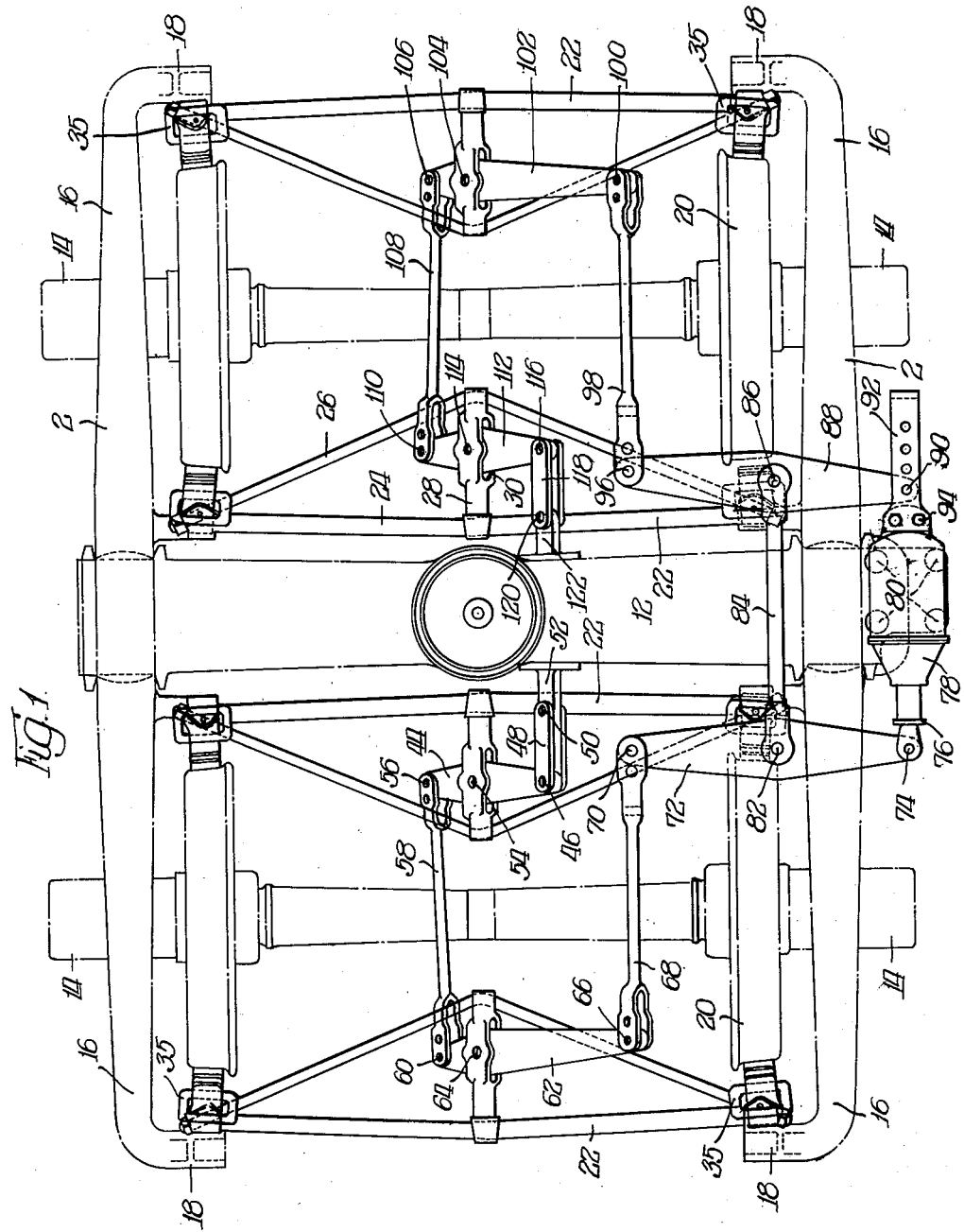

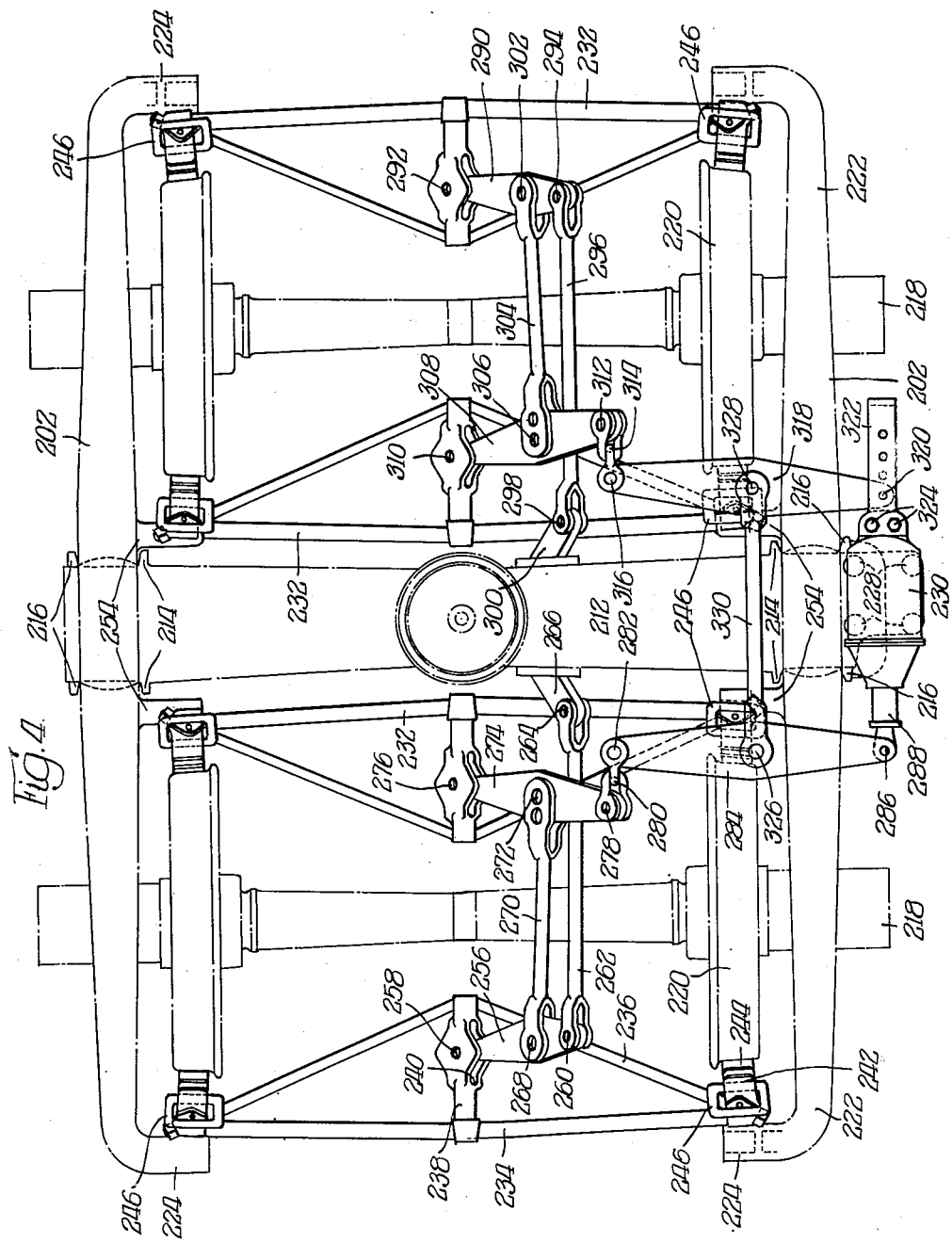

Dec. 16, 1941. W. H. BASELT 2,266,701
CLASP BRAKE
Filed Sept. 11, 1940 4 Sheets-Sheet 4
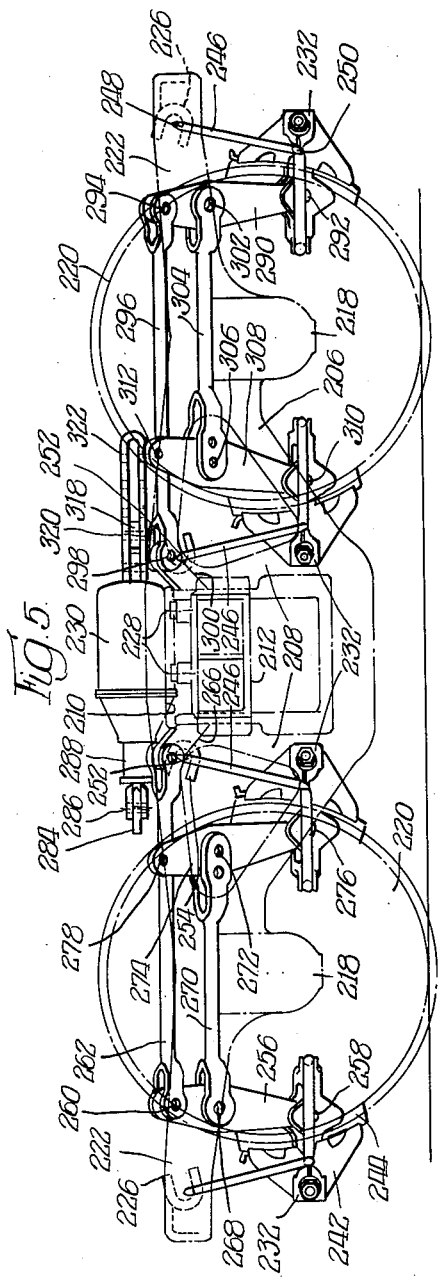
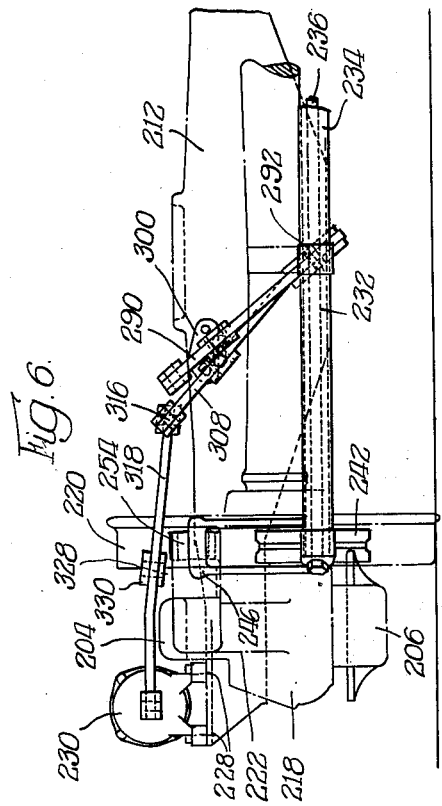
INVENTOR.
Walter H. Baselt,
BY
attÿ.

Patented Dec. 16, 1941

2,266,701

UNITED STATES PATENT OFFICE 2,266,701

CLASP BRAKE

Walter H. Baselt, Chicago, Ill., assignor to American Steel Foundries, Chicago, Ill., a corporation of New Jersey Application September 11, 1940, Serial No. 356,296

25 Claims. (Cl. 188—56)

My invention relates to brake rigging for a four wheel railway car truck and more particularly to a type of rigging commonly designated clasp brake wherein brake heads and brake shoes are supported at opposite sides of each wheel for engagement therewith.

Under present operating conditions, freight cars often travel at speeds comparable or even greater than those of some passenger trains, and it is necessary to afford in many cases a maximum of braking capacity in order safely to control such trains.

An object of my invention is to devise a clasp brake arrangement for a railway freight car truck which will be eminently suitable for use in high speed freight car service. It comprehends an arrangement wherein the power means is mounted on the freight car truck in what is commonly designated a unit cylinder structure, and my novel arrangement provides for the mounting of the power means on the transverse member or load carrying member of the car truck outboard of one side frame, said power means affording actuation of the complete rigging at both ends of the truck.

A specific object of my invention is such an arrangement of clasp brake rigging for a four wheel railway freight car truck wherein the rigging for both ends of the truck is fulcrumed from a transverse load carrying member or bolster, said fulcrums being positioned on said load carrying member in such manner as to avoid any turning or rotational effect on said bolster when the power is applied to the brake linkage.

A different object of my invention is such a clasp brake rigging of unit cylinder type wherein cylinder levers are connected at opposite ends of the power means with one of said connections made adjustable and with the opposite ends of the cylinder levers connected to actuate the rigging at the respective ends of the truck.

Yet another object of my invention is a clasp brake rigging of unit cylinder type for a four wheel freight car truck wherein truss type beams are afforded and a single pair of live and dead brake levers is associated with the rigging at each end of the truck, thereby providing maximum efficiency and simplicity.

Figure 1 is a top plan view of a railway car truck and a brake arrangement therefor showing one embodiment of my invention. Figure 2 is a side elevation of the truck and brake arrangement shown in Figure 1, and Figure 3 is a fragmentary end elevation thereof taken from the right as seen in Figures 1 and 2.

Figure 4 illustrates another modification of my invention and shows a top plan view of a car truck and brake arrangement. Figure 5 shows a side elevation of the truck and brake arrangement shown in Figure 4, and Figure 6 is a fragmentary end view of the truck and brake structure shown in Figures 4 and 5, taken from the right as seen in those figures.

Describing the structure in greater detail, the car truck is of conventional form and comprises spaced side frames 2, 2 of truss type, each of said frames comprising a compression member 4, a tension member 6, and spaced columns 8, 8 defining with said members a bolster opening 10, said tension member below said opening affording a seat for a spring group (not shown) on which may be seated the end of the bolster 12, said bolster being afforded inboard and outboard guide lugs and an intervening guide surface for engagement with complementary surfaces on the adjacent columns in well-known manner. The tension and compression members of each frame merge toward the opposite ends of the frame with integrally formed journal boxes 14, 14, and the frame extends beyond said boxes in integral brackets 16, 16 at opposite ends of the truck with inturned portions 18, 18. The journal boxes 14 afford the usual means of connection for the associated spaced wheel and axle assemblies 20, 20.

The brake rigging comprises similar right and left truss type beams 22, 22 mounted at the ends of the truck, and intermediate the wheels, each of said beams comprises (Figure 1, right center) a compression member 24, a tension member 26, a central strut or fulcrum 28 slotted as at 30 to accommodate an associated brake lever, and on each end of said beam is mounted a brake head 32 with the associated brake shoe 34 arranged for engagement with the periphery of the adjacent wheel. Each end beam is supported at opposite sides of the truck through the medium of hangers 35, 35 hung at their opposite ends from brake hanger brackets or jaws 36, 36 integrally formed on the inturned bracket 18, and the lower ends of the hanger 35 are pivotally connected as at 38, 38 to the adjacent brake heads. The intermediate beams are similarly supported by hangers 35, 35 pivotally hung at their upper ends from brake hanger brackets or jaws 40, 40 integrally formed on the inboard face of each side frame adjacent the junctures of the columns 8, 8 with the compression member 4, said intermediate hangers 35, 35 affording support for the intermediate beams by pivotal connections as at 42, 42 to the brake heads at the ends of said intermediate beams.

The rigging comprises the dead brake lever 44 (Figure 1, left center) fulcrumed at its upper end as at 46 from the compression links 48, 48 whose opposite ends are pivotally secured as at 50 from the fulcrum 52 secured on the side of the bolster 12 in any convenient manner. The brake lever 44 is pivotally connected as at 54 in the fulcrum of the adjacent truss beam, and the lower end of the brake lever 44 has a pivotal and adjustable connection as at 56 to the pull rod 58 which extends below the adjacent axle and has its opposite end pivotally and adjustably connected as at 60 to the live brake lever 62, said live brake lever being pivotally mounted as at 64 in the strut or fulcrum of the adjacent end truss beam. The upper end of the live brake lever 62 is pivotally and adjustably connected as at 66 to the pull rod 68 which extends above the adjacent axle and is pivotally and adjustably connected at its opposite end as at 70 to the bent live cylinder lever 72 whose opposite end extends over the side frame and is pivotally connected as at 74 to the piston 76 of the power means 78 mounted as at 80, 80 on the end of the bolster 12 which projects outboard the adjacent side frame through the bolster opening 10 at the top thereof. Intermediate the ends of the live cylinder lever 72 is pivotally connected as at 82 the pull rod 84 whose opposite end is pivotally connected as at 86 intermediate the ends of the bent dead cylinder lever 88, the outer end of which extends over the side frame and is pivotally and adjustably fulcrumed as at 90 from the slotted strap 92 secured as at 94 at the opposite end of the cylinder 78. The inner end of the live cylinder lever 88 is pivotally and adjustably connected as at 96 to the pull rod 98 which extends above the adjacent axle and has its opposite end pivotally and adjustably connected as at 100 to the live brake lever 102 which is fulcrumed intermediate its ends as at 104 in the strut of the adjacent truss beam and extends therethrough for pivotal and adjustable connection as at 106 with the pull rod 108 which extends below the adjacent axle and is pivotally and adjustably connected as at 110 to the lower end of the dead truck lever 112 which is fulcrumed intermediate its ends as at 114 in the strut of the adjacent intermediate truss beam and extends therethrough for pivotal connection at its upper end as at 116 to the compression links 118, said links being pivotally connected as at 120 to the fulcrum 122 secured on the face or side of the bolster directly opposite the fulcrum 52 and in the same vertical and horizontal planes therewith.

In operation of the brake arrangement shown in this modification, actuation of the power means 78 rotates the live cylinder lever 72 in a clockwise direction about the pivot 82 intermediate its ends and through the pull rods 68 and 58 actuate the live and dead truck levers 62 and 44 connected to the beams at opposite sides of the wheel and axle assembly at one end of the truck. Continued application of the power causes the dead cylinder lever 88 to rotate in a counterclockwise direction about the fulcrum 90 at its outboard end, thus actuating the live and dead levers 102 and 112 through the pull rods 98 and 108 and moving the brake beams at the opposite ends of the truck to bring the associated brake shoes into engagement with the adjacent wheels.

In the modification shown in Figures 4, 5, and 6, the truck structure is substantially identical with that just described and comprises spaced side frames 202, 202 each of truss type having a compression member 204 and a tension member 206 with integral spaced columns 208, 208 forming therewith the bolster opening 210 through which may project the end of the bolster 212, said bolster end being retained in said window opening by cooperation of inboard and outboard guide flanges 214 and 216 respectively and intervening guide surfaces in cooperation with complementary surfaces on the adjacent columns. The tension and compression members of each side frame merge adjacent their ends with integrally formed journal boxes 218, 218 forming the usual means of connection to the spaced wheel and axle assemblies 220, 220, and the frames are extended longitudinally of the truck beyond said journal boxes in the integral end portions 222, 222 which are inturned at their ends as at 224, 224 to form integral brake hanger jaw brackets 226, 226.

The bolster end at one side of the truck is projected somewhat beyond the side frame to afford support as at 228, 228 for the power means or brake cylinder 230 which is thus supported at a level similar to that of the previous modification and at a height sufficient to afford clearance for the cylinder levers 284 and 318 (hereafter referred to) which extend over the compression member of the side frame. Clearance is thus afforded for vertical movements of the bolster in the window opening normally taking place under operative conditions due to support of said bolster on the usual spring group (not shown).

In this modification as in that previously described, the brake arrangement is of clasp type and comprises brake beams 232, 232 supported at opposite sides of each wheel and axle assembly, each of said beams being of truss type with a compression member 234 (Figure 4, left), a tension member 236, and an intermediate strut or fulcrum 238 slotted as at 240 to accommodate an associated truck lever, said tension and compression members being joined at their ends to afford support for brake heads 242, 242 with associated brake shoes 244, 244. The end beams are supported from the before-mentioned inturned brackets 224, 224 at the opposite ends of each side frame through the medium of brake hangers 246, 246 which are pivotally supported as at 248, 248 from the brake hanger brackets 226, 226, said hangers having a pivotal connection at their lower ends as at 250, 250 to the adjacent brake head. The intermediate brake beams are likewise supported by brake hangers 246, 246, said intermediate hangers being pivotally supported at their upper ends as at 252, 252 from the brackets 254, 254 formed on the inboard face of each side frame adjacent the junctures of the columns 208, 208 with the compression member 204.

The brake rigging comprises the truck lever 256 (Figure 4, left) fulcrumed at its lower end as at 258 in the strut of the adjacent beam and pivotally connected at its upper end as at 260 to the compression rod 262, the opposite end of which is fulcrumed as at 264 from the bracket or fulcrum 266 secured in any convenient manner on the adjacent side wall of the bolster 212. The dead truck lever 256 is pivotally connected intermediate its ends as at 268 to the pull rod 270, the opposite end of which is pivotally and adjustably connected as at 272 to the live truck lever 274 whose lower end is fulcrumed as at 276 in the central strut or fulcrum of the adjacent truss beam. The upper end of the live truck lever 274 has a pivotal connection as at 278 to the link or clevis means 280, the opposite end of said clevis means having a pivotal connection as at 282 to the live cylinder lever 284, said cylinder lever extending over the side frame and having its outboard end pivotally connected as at 286 to the cylinder 288 of the before-mentioned power means 230. At the opposite end of the truck the dead truck lever 290 is fulcrumed at its lower end as at 292 in the adjacent brake beam (Figure 4, right), said lever 290 having its upper end pivotally connected as at 294 to the compression rod 296 whose opposite end is fulcrumed as at 298 from the bracket 300 which is secured on the opposite side wall of the bolster in longitudinal alignment with the before-mentioned similar bracket 266. The dead truck lever 290 is pivotally connected intermediate its ends as at 302 to the pull rod 304, said pull rod having a pivotal and adjustable connection at its opposite end as at 306 to the live truck lever 308, the lower end of said live truck lever being fulcrumed as at 310 in the center strut of the adjacent beam. The upper end of the live truck lever 308 extends over the pull rod 296 and has a pivotal connection as at 312 to the clevis or link means 314, and the opposite end of said link means has a pivotal connection as at 316 to the dead cylinder lever 318 which extends over the side frame and is pivotally and adjustably connected as at 320 to the slotted strap 322 which is secured as at 324, 324 on the opposite end of the power means 230. The live and dead cylinder levers 284 and 318 are pivotally connected intermediate their ends as at 326 and 328 respectively by the pull rod 330.

In operation of the rigging shown in the modification last described, actuation of the power means 230 causes the live cylinder 284 to rotate in a clockwise direction about the fulcrum intermediate its ends, thus actuating the live and dead truck levers 274 and 256 through the rods 262 and 270, thus bringing the brake beams into position to engage the braking surfaces at opposite sides of the adjacent wheel and axle assembly. Continued actuation of the power means causes the dead cylinder lever 318 to rotate in a counterclockwise direction about the fulcrum 320 at its outboard end, thus actuating the live and dead truck levers 308 and 290 through the rods 304 and 296, thus moving the brake beams at the opposite end of the truck and bringing the associated brake shoes into engagement with the peripheries of the adjacent wheels. It will be understood that the actuation of the power means causes the rigging to operate substantially simultaneously at opposite ends of the truck, but the above consecutive description of the method of operation for both modifications is given for the sake of simplicity.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a brake arrangement for a railway car truck, a frame comprising spaced side members having bolster openings, a transverse load carrying member extending between said side members and having its ends supported in said openings, power means supported on one of said ends outwardly of one of said side members, supporting wheel and axle assemblies, and brake rigging comprising truss beams with center struts supported at opposite sides of each assembly, interconnected live and dead brake levers associated with respective beams for each assembly, and live and dead cylinder levers connected at their outer ends to opposite ends of said power means, connected intermediate their ends to each other, and connected at their inboard ends to said live brake levers respectively.

2. In a railway car truck, a frame comprising a truss side frame with tension and compression members, and spaced columns forming therewith a bolster opening, a bolster supported in said opening for vertical movement therein and having an end projecting outboard of said side frame, power means supported on said outboard end for movement therewith, supporting wheel and axle assemblies, braking means comprising truss beams supported at opposite sides of each assembly, interconnected live and dead brake levers associated with the beams at opposite sides of each assembly, and live and dead cylinder levers connected at their outer ends to opposite ends of said power means, connected intermediate their ends to each other, and connected at their inboard ends to the live brake levers at opposite ends of the truck.

3. In a brake arrangement for a railway car truck, spaced side frames of truss type each comprising a tension and compression member, and spaced columns merging therewith to form a bolster opening, a bolster connecting said side frames with end portions supported in said openings respectively, power means supported on one of said end portions outboard the adjacent side frame, interconnected live and dead cylinder levers connected at their opposite ends to said power means, supporting wheel and axle assemblies, brake beams supported from said frames at opposite sides of each assembly, live and dead truck levers fulcrumed in the beams at opposite sides of each assembly and connected at their lower ends to each other, and pull rods connecting said live truck levers to said cylinder levers at opposite ends of the truck.

4. In a brake arrangement for a railway car truck, spaced side frames of truss type each comprising a tension and compression member, and spaced columns merging therewith to form a bolster opening, a bolster connecting said side frames with end portions supported in said openings respectively, power means supported on one of said end portions outboard the adjacent side frame, inter-connected live and dead cylinder levers connected at their opposite ends to said power means, supporting wheel and axle assemblies, brake beams supported from said frames at opposite sides of each assembly, live and dead truck levers fulcrumed in the beams associated with each assembly and connected at corresponding ends to each other, and operative connections between the live truck levers and the cylinder levers at opposite ends of the truck.

5. In a brake arrangement for a railway car truck, spaced side frames of truss type each comprising a tension and compression member, and spaced columns merging therewith to form a bolster opening, a bolster connecting said side frames with end portions supported in said openings respectively, power means supported on one of said end portions outboard the adjacent side frame, inter-connected live and dead cylinder levers connected at their opposite ends to said power means, supporting wheel and axle assemblies, brake beams supported from said frames at opposite sides of each assembly, dead truck levers fulcrumed in the beams intermediate the wheels, live truck levers fulcrumed in the end beams, pull rods connecting the live and dead truck levers for each assembly, and other pull rods connecting the live truck lever to the adjacent cylinder lever at each end of the truck.

6. In a brake arrangement for a railway car truck, a frame comprising spaced side members having bolster openings, a transverse load carrying member extending between said side members and having its ends supported in said openings, power means supported on one of said ends outwardly of one of said side members, supporting wheel and axle assemblies, and brake rigging comprising truss beams with center struts supported at opposite sides of each assembly, interconnected live and dead brake levers associated with respective beams for each assembly, and live and dead cylinder levers connected at their outer ends to opposite ends of said power means, connected intermediate their ends to each other, and connected at their inboard ends to said live brake levers respectively, said dead brake levers being fulcrumed from brackets in alignment longitudinally of said truck on opposite sides of said load carrying member.

7. In a brake arrangement for a railway car truck, a frame comprising spaced side members having bolster openings, a transverse load carrying member extending between said side members and having its ends supported in said openings, power means supported on one of said bolster ends outwardly of one of said side members, supporting wheel and axle assemblies, and brake rigging comprising truss beams with center struts supported at opposite sides of each assembly, interconnected live and dead brake levers associated with respective beams for each assembly, and live and dead cylinder levers connected at their outer ends to opposite ends of said power means, connected intermediate their ends to each other, and connected at their inboard ends to said live brake levers respectively, said dead brake levers being associated with the end beams and being fulcrumed from aligned brackets on opposite sides of said load carrying member.

8. In a brake arrangement for a railway car truck, a frame comprising spaced side members having bolster openings, a transverse load carrying member extending between said side members and having its ends supported in said openings, power means supported on one of said ends outwardly of one of said side members, supporting wheel and axle assemblies, and brake rigging comprising truss beams with center struts supported at opposite sides of each assembly, interconnected live and dead brake levers associated with respective beams for each assembly, and live and dead cylinder levers connected at their outer ends to opposite ends of said power means, connected intermediate their ends to each other, and connected at their inboard ends to said live brake levers respectively, said dead brake levers being associated with the beams intermediate the wheels and fulcrumed from aligned brackets on opposite sides of said load carrying member.

9. In a railway car truck, a frame comprising a truss side frame with tension and compression members, and spaced columns forming therewith a bolster opening, a bolster supported in said opening for vertical movement therein and having an end projecting outboard of said side frame, power means fixed on said outboard end for movement therewith, supporting wheel and axle assemblies, braking means comprising truss beams supported at opposite sides of each assembly, interconnected live and dead brake levers associated with the beams at opposite sides of each assembly, and live and dead cylinder levers connected at their outer ends to opposite ends of said power means, connected intermediate their ends to each other, and connected at their inboard ends to the live brake levers at opposite ends of the truck, said dead brake levers being associated with the end beams and fulcrumed from aligned brackets on opposite sides of said bolster.

10. In a railway car truck, a frame comprising a truss side frame with tension and compression members, and spaced columns forming therewith a bolster opening, a bolster supported in said opening for vertical movement therein and having an end projecting outboard of said side frame, power means supported on said outboard end for movement therewith, supporting wheel and axle assemblies, braking means comprising truss beams supported at opposite sides of each assembly, interconnected live and dead brake levers associated with the beams at opposite sides of each assembly, and live and dead cylinder levers connected at their outer ends to opposite ends of said power means, connected intermediate their ends to each other, and connected at their inboard ends to the live brake levers at opposite ends of the brake, said dead truck levers being associated with the intermediate beams and fulcrumed from aligned brackets on opposite sides of said bolster.

11. In a brake arrangement for a four wheel railway car truck, a truss side frame having tension and compression members, and spaced columns merging therewith to form a bolster opening, spaced supporting wheel and axle assemblies, a bolster having an end projecting through said opening for vertical movement therein, power means supported on said projecting end outboard of said side frame for vertical movement with said bolster, interconnected live and dead cylinder levers connected to opposite ends of said power means and extending over said compression member, braking means comprising brake beams with center struts supported at opposite sides of each wheel and axle assembly, live and dead truck levers connected respectively to the beams at opposite sides of each assembly and connected intermediate their ends to each other, and connections between said cylinder levers and the live truck levers at opposite ends of the truck.

12. In a brake arrangement for a railway car truck, spaced side frames of truss type each comprising a tension and compression member, and spaced columns merging therewith to form a bolster opening, a bolster connecting said side frames and having end portions supported in said openings respectively, power means supported on one of said end portions outboard the adjacent side frame, interconnected live and dead cylinder levers connected at their opposite ends to said power means, supporting wheel and axle assemblies, brake beams supported from said frames at opposite sides of each assembly, livand dead truck levers fulcrumed at their lower ends from the beams at opposite sides of each wheel and axle assembly and connected intermediate their ends to each other, said dead truck levers being fulcrumed from aligned brackets on opposite sides of said bolster, and said live truck levers having their opposite ends connected respectively to said cylinder levers.

13. In a brake arrangement for a railway car truck, spaced side frames of truss type each comprising a tension and compression member, and spaced columns merging therewith to form a bolster opening, a bolster connecting said side frames and having end portions supported in said openings respectively, power means supported on one of said end portions outboard the adjacent side frame, interconnected live and dead cylinder levers connected at their opposite ends to said power means, supporting wheel and axle assemblies, brake beams supported from said frames at opposite sides of each assembly, dead truck levers fulcrumed at their upper ends from aligned brackets on opposite sides of said bolster and connected at their lower ends to the end beams, live truck levers connected at their lower ends to the intermediate beams, pull rods adjustably connecting the live and dead truck levers at opposite ends of the truck, and connections between said live truck levers and said cylinder levers at opposite ends of the truck.

14. In a brake arrangement for a railway car truck, spaced side frames of truss type each comprising a tension and compression member, and spaced columns merging therewith to form a bolster opening, a bolster connecting said side frames with end portions supported in said openings respectively, power means supported on one of said end portions outboard the adjacent side frame, interconnected live and dead cylinder levers connected at their opposite ends to said power means, supporting wheel and axle assemblies, brake beams supported from said frames at opposite sides of each assembly, dead truck levers fulcrumed at their lower ends in the end beams, live truck levers fulcrumed at their lower ends in the intermediate beams, pull rods connecting the live and dead levers at each end of the truck, compression rods extending between the said dead truck levers and aligned bracket means on opposite sides of said bolster, and connections between the live truck levers at opposite ends of the truck and said cylinder levers respectively.

15. In a brake arrangement for a railway car truck, spaced side frames of truss type each comprising a tension and compression member, and spaced columns merging therewith to form a bolster opening, a bolster connecting said side frames and having end portions supported in said openings respectively, power means supported on one of said end portions outboard the adjacent side frame, interconnected live and dead cylinder levers connected at their opposite ends to said power means, supporting wheel and axle assemblies, brake beams supported from said frames at opposite sides of each assembly, dead truck levers fulcrumed intermediate their ends from the intermediate beams and fulcrumed at their upper ends from aligned points on opposite sides of said bolster, live truck levers fulcrumed intermediate their ends from the end beams, pull rods connecting the live and dead truck levers at opposite ends of the truck, and pull rods connecting the upper ends of said live truck levers with the inboard ends of the cylinder levers at opposite ends of the truck.

16. In a brake arrangement for a four wheel railway car truck, a truss side frame having tension and compression members, and spaced columns merging therewith to form a bolster opening, spaced supporting wheel and axle assemblies, a bolster having an end projecting through said opening for vertical movement therein, power means supported on said projecting end outboard of said side frame for vertical movement with said bolster, interconnected live and dead cylinder levers connected to opposite ends of said power means and extending over said compression member, braking means comprising brake beams with center struts supported at opposite sides of each wheel and axle assembly, live and dead truck levers connected respectively to the beams at opposite sides of each assembly and connected intermediate their ends to each other, and connections between said cylinder levers and said live truck levers at opposite ends of the truck, said dead truck levers being associated with the beams intermediate the wheels and fulcrumed from aligned brackets on opposite sides of said bolster.

17. In a brake arrangement for a four wheel railway car truck, a truss side frame having tension and compression members, and spaced columns merging therewith to form a bolster opening, spaced supporting wheel and axle assemblies, a bolster having an end projecting through said opening for vertical movement therein, power means supported on said projecting end outboard of said side frame for vertical movement with said bolster, interconnected live and dead cylinder levers connected to opposite ends of said power means and extending over said compression member, braking means comprising brake beams with center struts supported at opposite sides of each wheel and axle assembly, live and dead truck levers connected respectively to the beams at opposite sides of each assembly and connected intermediate their ends to each other, and connections between said cylinder levers and said live truck levers at opposite ends of the truck, said dead truck levers being associated with the end beams and fulcrumed from aligned brackets on opposite sides of said bolster.

18. In a brake arrangement for a four wheel railway car truck, spaced side frames of truss type each comprising a compression member, a tension member, and spaced columns forming therewith a bolster opening and spaced window openings, said tension and compression members merging beyond said window openings with integral journal boxes, spaced supporting wheel and axle assemblies, inturned brackets formed on the extremities of said side frames, intermediate brackets on the inboard faces of said frames, a load carrying member connected between said frames with end portions extending into said bolster openings, power means supported on one of said end portions outboard the adjacent frame, hangers supporting end and intermediate beams from said brackets respectively, interconnected live and dead truck levers associated with the beams at opposite sides of each assembly, and interconnected live and dead cylinder levers connected at opposite ends of said power means and extending over the adjacent frame for connection to said live truck levers at opposite ends of the truck.

19. In a brake arrangement for a four wheel railway car truck, spaced side frames of truss type each comprising a compression member, and spaced columns forming therewith a bolster opening and spaced window openings, said tension and compression members merging beyond said window openings with integral journal boxes, spaced supporting wheel and axle assemblies, inturned brackets formed on the extremities of said side frames, intermediate brackets on the inboard faces of said frames, a load carrying member connected between said frames with end portions extending into said bolster openings, power means supported on one of said end portions outboard the adjacent frame, hangers supporting end and intermediate beams from said brackets respectively, interconnected live and dead truck levers associated with the beams at opposite sides of each assembly, and interconnected live and dead cylinder levers connected at opposite ends of said power means and extending over the adjacent frame for connection to said live truck levers at opposite ends of the truck, said dead truck levers being associated with the beams intermediate the wheels and fulcrumed from aligned brackets on opposite sides of said bolster.

20. In a brake arrangement for a four wheel railway car truck, spaced side frames of truss type each comprising a compression member, a tension member, and spaced columns forming therewith a bolster opening and spaced window openings, said tension and compression members merging beyond said window openings with integral journal boxes, spaced supporting wheel and axle assemblies, inturned brackets formed on the extremities of said side frames, intermediate brackets on the inboard faces of said frames, a load carrying member connected between said frames with end portions extending into said bolster openings, power means supported on one of said end portions outboard the adjacent frame, hangers supporting end and intermediate beams from said brackets respectively, interconnected live and dead truck levers associated with the beams at opposite sides of each assembly, and interconnected live and dead cylinder levers connected at opposite ends of said power means and extending over the adjacent frame for connection to said live truck levers at opposite ends of the truck, said dead truck levers being associated with the end beams and fulcrumed from aligned brackets on opposite sides of said bolster.

21. In a car truck, spaced side frames, a load carrying member supported thereon with an end extending outboard one of said frames, power means on said outboard end, supporting wheel and axle assemblies, and brake rigging comprising beams supported at opposite sides of each assembly, interconnected live and dead brake levers associated with the beams for each assembly, and live and dead cylinder levers connected at their outer ends to said power means, connected intermediate their ends to each other, and connected at their inboard ends to said live brake levers respectively.

22. In a car truck, spaced side frames, a connecting bolster having an end projecting outboard one of said frames, power means on said outboard end, supporting wheel and axle assemblies, and braking means comprising beams supported at opposite sides of each assembly, interconnected live and dead brake levers associated with respective beams for each assembly, interconnected live and dead cylinder levers connected at corresponding ends to said power means and connected at their opposite ends to said live brake levers respectively.

23. In a car truck, spaced side frames, a connecting bolster having an end extending outboard one of said frames, power means on said outboard end, supporting wheel and axle assemblies, interconnected cylinder levers connected at opposite ends of said power means, brake beams supported from said frames at opposite sides of each assembly, interconnected live and dead truck levers associated with respective beams for each assembly, and pull rods connecting said live truck levers to said cylinder levers at opposite ends of the truck.

24. In a brake arrangement for a truck, spaced side frames, a connecting bolster having an end projecting outboard one of said frames, power means on said end, supporting wheel and axle assemblies, interconnected cylinder levers connected at corresponding ends to said power means, brake beams at opposite sides of each assembly, live and dead truck levers associated with the beams for each assembly, connections between the truck levers for each assembly, and an operative connection between each live truck lever and the adjacent cylinder lever.

25. In a brake arrangement, side frames, a connecting bolster having an end projecting outboard said frame, power means on said end, interconnected live and dead cylinder levers connected at opposite ends of said power means, one of said last-mentioned connections being adjustable, supporting wheel and axle assemblies, brake beams at opposite sides of each assembly, dead truck levers fulcrumed in the intermediate beams, live truck levers fulcrumed in the end beams, pull rods connecting the truck levers for each assembly, and a connection between each live truck lever and the adjacent cylinder lever.

WALTER H. BASELT.